(12) United States Patent
Brooker et al.

(10) Patent No.: US 10,955,683 B2
(45) Date of Patent: Mar. 23, 2021

(54) IMAGING INCIDENT ANGLE TRACKER

(71) Applicant: Thorlabs, Inc., Newton, NJ (US)

(72) Inventors: Jeffrey S. Brooker, Centreville, VA (US); Hongzhou Ma, Centerville, VA (US); Shane Patton, Bunker Hill, WV (US); Eric Lieser, Boyce, VA (US); Brett D'Alessio, Califon, NJ (US)

(73) Assignee: Thorlabs, Inc., Newton, NJ (US)

( * ) Notice: Subject to any disclaimer, the term of this patent is extended or adjusted under 35 U.S.C. 154(b) by 197 days.

(21) Appl. No.: 16/186,064

(22) Filed: Nov. 9, 2018

(65) Prior Publication Data
US 2019/0146230 A1 May 16, 2019

Related U.S. Application Data

(60) Provisional application No. 62/584,237, filed on Nov. 10, 2017.

(51) Int. Cl.
*G02B 27/14* (2006.01)
*G02B 27/09* (2006.01)
(Continued)

(52) U.S. Cl.
CPC ......... *G02B 27/141* (2013.01); *G02B 21/245* (2013.01); *G02B 21/26* (2013.01);
(Continued)

(58) Field of Classification Search
CPC .... G02B 27/14; G02B 27/144; G02B 27/283; G02B 27/145; G02B 27/0172;
(Continued)

(56) References Cited

U.S. PATENT DOCUMENTS 5,271,592 A * 12/1993 Ludwig ............... F16M 11/043
248/333
5,801,881 A * 9/1998 Lanni ..................... G02B 21/06
359/368
(Continued)

FOREIGN PATENT DOCUMENTS

RU 2116618 C1 7/1998
RU 2 447 468 C2 4/2012

OTHER PUBLICATIONS

International Search Report and Written Opinion issued by the International Searching Authority for corresponding International application No. PCT/US 2018/060091 dated Mar. 7, 2019.

*Primary Examiner* — Mohammed A Hasan
(74) *Attorney, Agent, or Firm* — Myers Wolin, LLC

(57) ABSTRACT

An imaging incident angle tracking device, including: a light source; a first and second beam splitters or dichroic mirrors; a position sensitive detector; wherein the first and second beam splitters or dichroic mirrors are configured to direct light from the light source to a window surface through an objective lens; the first and second beam splitters or dichroic mirrors is further configured to direct the light reflected from the window surface and through the objective lens into the position sensitive detector. A positioning system, including: a baseplate; a platform; a plurality of strut assemblies connecting the baseplate and the platform; wherein each of the strut assembly includes: a linear actuator; a first flexure assembly and a second flexure assembly at the first and second ends of the strut assembly; the first and second flexure assemblies are rigid along and flexibly bendable orthogonal to the length of the strut assembly.

13 Claims, 14 Drawing Sheets

(51) Int. Cl.
*G02B 26/08* (2006.01)
*G02B 21/26* (2006.01)
*G02B 21/24* (2006.01)
*G02B 21/06* (2006.01)

(52) U.S. Cl.
CPC ..... *G02B 26/0816* (2013.01); *G02B 27/0955* (2013.01); *G02B 21/06* (2013.01); *G02B 27/14* (2013.01)

(58) Field of Classification Search
CPC .... G02B 27/141; G02B 21/26; G02B 21/245; G02B 27/0955; G02B 26/0816; G02B 21/06
USPC ......................................................... 359/629
See application file for complete search history.

(56) References Cited

U.S. PATENT DOCUMENTS

| | | | |
|---|---|---|---|
| 2013/0085531 A1* | 4/2013 | Hartman | A61H 1/0274 606/245 |
| 2015/0015700 A1 | 1/2015 | Becker et al. | |
| 2018/0031088 A1* | 2/2018 | Warriner | F16H 21/04 |

\* cited by examiner

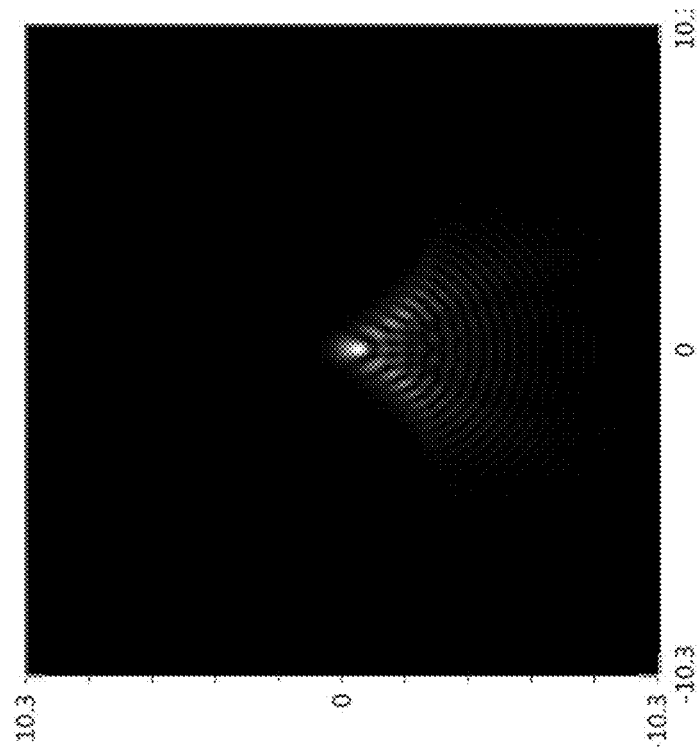
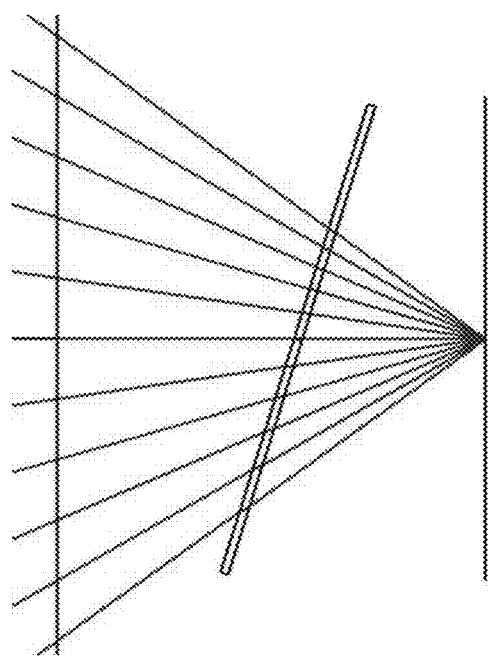
FIG. 4B
FIG. 4A

IMAGING INCIDENT ANGLE TRACKER

CROSS-REFERENCE TO RELATED APPLICATIONS

This application claims the benefit of U.S. Provisional Application No. 62/584,237, filed on Nov. 10, 2017, the contents of which are incorporated herein by reference.

FIELD OF THE INVENTION

The invention generally relates to an optical microscopy apparatus that images a section of a large specimen with a curved profile which requires multiple axis of maneuver to orient the imaging system normal to the current field of view of the specimen.

BACKGROUND

For most optical microscopes the objective lens and sample are mounted on different stages. For imaging targets with sophisticated profiles, a stage may have up to six degrees of freedom to move the objective to the ideal position, which takes into account the angle relative to the sample. For in vivo imaging applications where imaging through a sample window is necessary, it is essential to keep the imaging objective normal to the window surface in order to maintain high optical resolution and minimize aberrations.

Most multiphoton physiological objectives are designed as water dipping lenses to better match the refractive index of tissue. However, imaging tissue through the sample window (usually glass cover slip) adds an additional change in index of refraction interface. The window acts as a glass wedge between these two medium. FIG. 1A shows an objective 110 immersed in a liquid medium (e.g., water) 120 over a window 130 which is normal to the optical axis of the objective lens. As shown in FIG. 1B, when a focused beam goes through it at normal incident, the focal plane will be symmetrically shifted deeper into the sample. While this will introduce some spherical aberration it is not usually detrimental to the optical resolution.

However, as depicted in FIG. 2A, if the window 230 is not normal to the optical axis of the objective 210 immersed in liquid 220, then the shift in focus is not symmetrical and severe aberration are introduced mostly in the form of astigmatism as shown in FIG. 2B.

The Point Spread Function (PSF) defines the resolution of an optical system. FIG. 3A shows the scenario of a normal incident condition through a 0.17 mm cover slip and FIG. 3B shows an ideal focused spot if the lens is corrected for the cover slip. FIG. 4A shows the scenario where the widow is tilted by 15° from the normal to the optical axis and FIG. 4B shows a severe aberration in the PSF. Simulations in Zemax between these two scenarios give drastic differences. Therefore, it is important to keep the imaging objective normal to the window surface in order to maintain high optical resolution and minimize aberrations.

To properly align the window with the optical axis of the objective lens, a stage may have up to six degrees of freedom to move the objective to the ideal position, which takes into account the angle relative to the sample. This may be accomplished with a Gough-Stewart platform, also known as hexapod, which is a type of parallel robot that has six prismatic actuators, commonly hydraulic jacks or electric actuators, attached in pairs to three positions on the platform's baseplate, crossing over to three mounting points on a top plate. Devices placed on the top plate can be moved in the six degrees of freedom in which it is possible for a freely-suspended body to move. These are the three linear movements X, Y, Z (lateral, longitudinal and vertical), and the three rotations pitch, roll, and yaw.

Typically, the mounting points on the plates include ball joints or universal joints for allowing free rotation at the mounting points. In high precision applications, high rigidity and near-zero play at the joints are essential for accurate positioning of the platform. However, ball joints and universal joints do have some play between the moving parts, such as the ball and socket, and the contact surfaces tend to wear out over time due to friction. Therefore, there is a need for an alternative joint for use in the platform to provide rigidity and zero play such that a truly parallel kinematic positioning stage may be realized.

SUMMARY

An embodiment of the present disclosure provides an imaging incident angle tracking device, including: a light source; a first beam splitter or dichroic mirror; a second beam splitter or dichroic mirror; and a position sensitive detector; wherein the first and second beam splitters or dichroic mirrors are configured to direct light from the light source to a window surface through an objective lens; the first and second beam splitters or dichroic mirrors are further configured to direct the light reflected from the window surface and through the objective lens into the position sensitive detector.

Another embodiment of the present disclosure provides an imaging system, including an imaging microscope equipped with an imaging incident angle tracking device that includes: a light source; a first beam splitter or dichroic mirror; a second beam splitter or dichroic mirror; and a position sensitive detector; wherein the first and second beam splitters or dichroic mirrors are configured to direct light from the light source to a window surface through an objective lens; the first and second beam splitters or dichroic mirrors are further configured to direct the light reflected from the window surface and through the objective lens into the position sensitive detector, and the imaging microscope is mounted on a positioning system that provides six degrees of freedom.

An embodiment of the present disclosure provides a positioning system, including: a baseplate; a platform; and a plurality of strut assemblies; wherein a first end of each of the plurality of strut assemblies is connected at a predefined location on the top surface of the baseplate and a second end of each of the plurality of strut assemblies is connected at a corresponding predefined location on the bottom surface of the platform; wherein each of the strut assembly comprises: a linear actuator configured to change the distance between the two ends along the length of the strut assembly; a first flexure assembly at the first end of the strut assembly; and a second flexure assembly at the second end of the strut assembly; wherein the first and second flexure assemblies are rigid along the length of the strut assembly, and flexibly bendable orthogonal to the length of the strut assembly.

BRIEF DESCRIPTION OF THE DRAWINGS

FIG. 4A shows the condition that the window is tilted by 15° from the normal to the optical axis, and FIG. 4B shows severe aberration in the point spread function.

DETAILED DESCRIPTION OF THE PREFERRED EMBODIMENTS

Figure 1B:
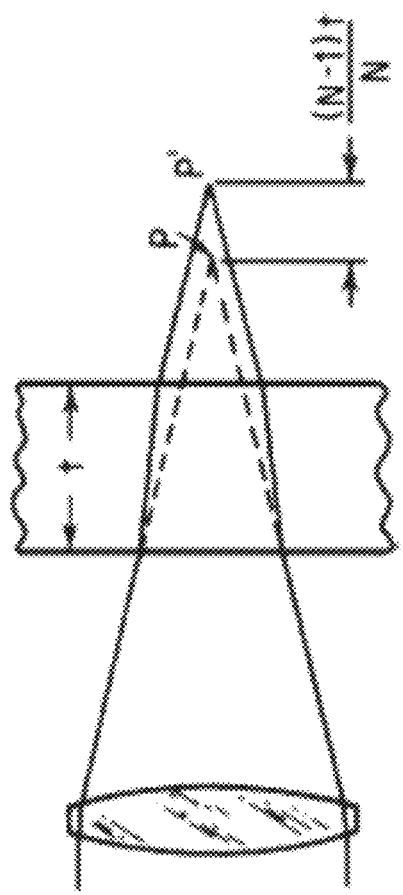
FIG. 1B illustrates the spherical aberration due to the sample window.
Figure 1A:
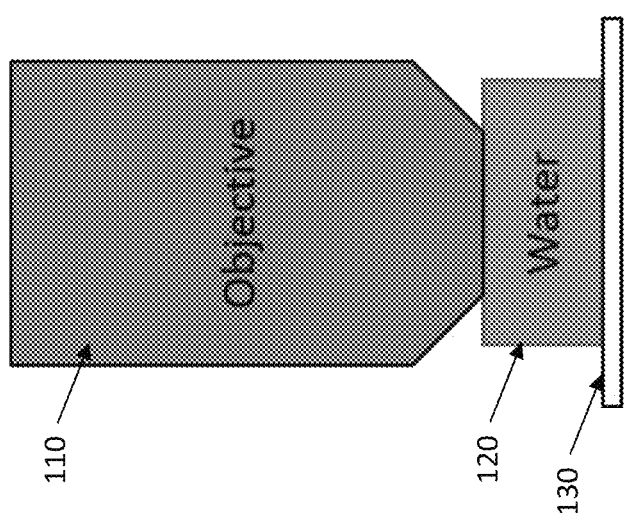
FIG. 1A illustrates a sample window that is normal to the optical axis of an objective lens.
Figure 2B:
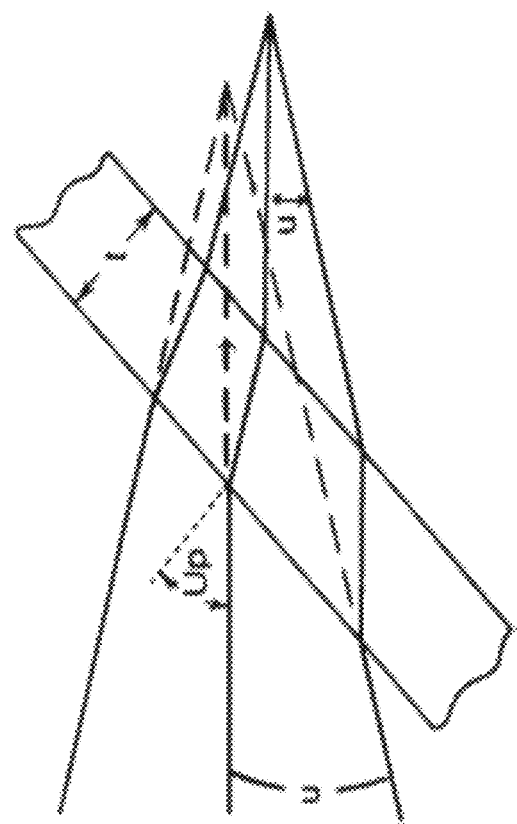
FIG. 2B illustrates the aberration due to the sample window.
Figure 2A:
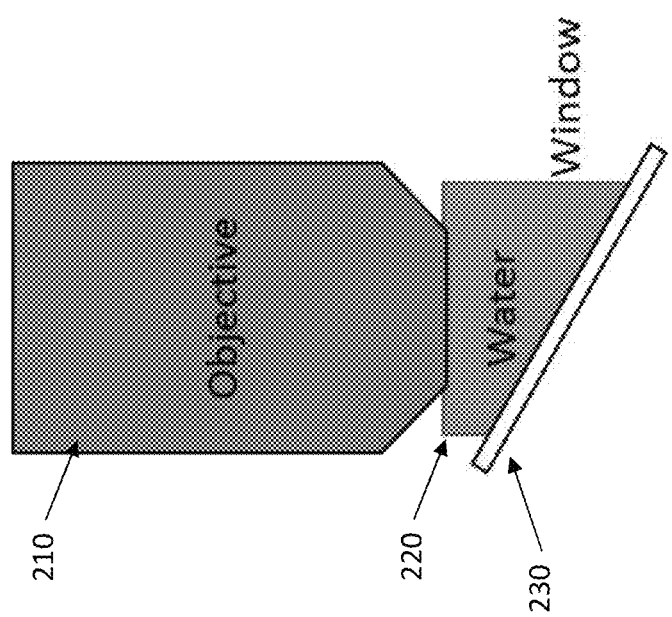
FIG. 2A illustrates a sample window that is not normal to the optical axis of an objective lens.
Figure 3B:
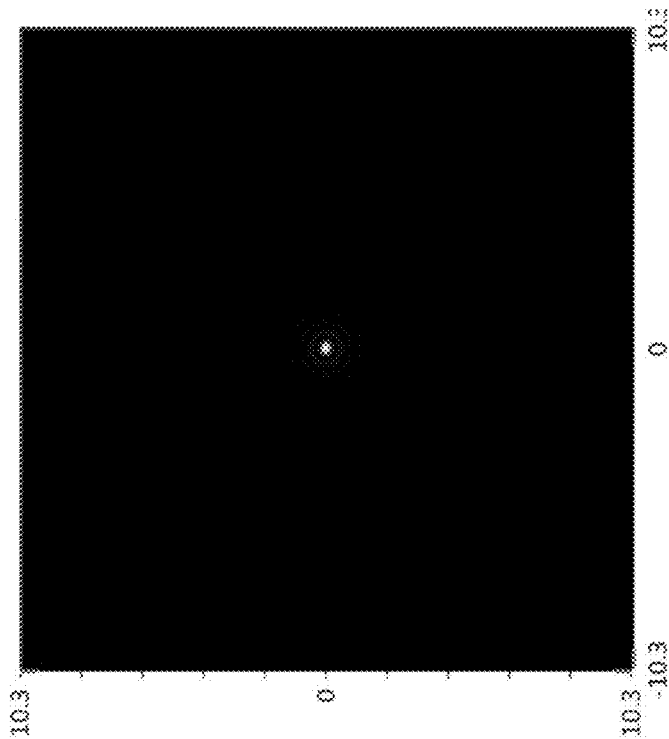
FIG. 3B shows the ideal focused spot if lens is corrected for the cover slip.
Figure 3A:
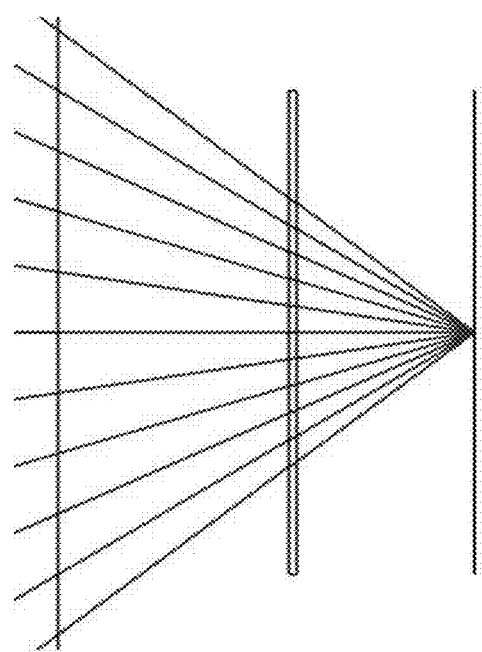
FIG. 3A shows a normal incident condition through a 0.17 mm cover slip.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 5:
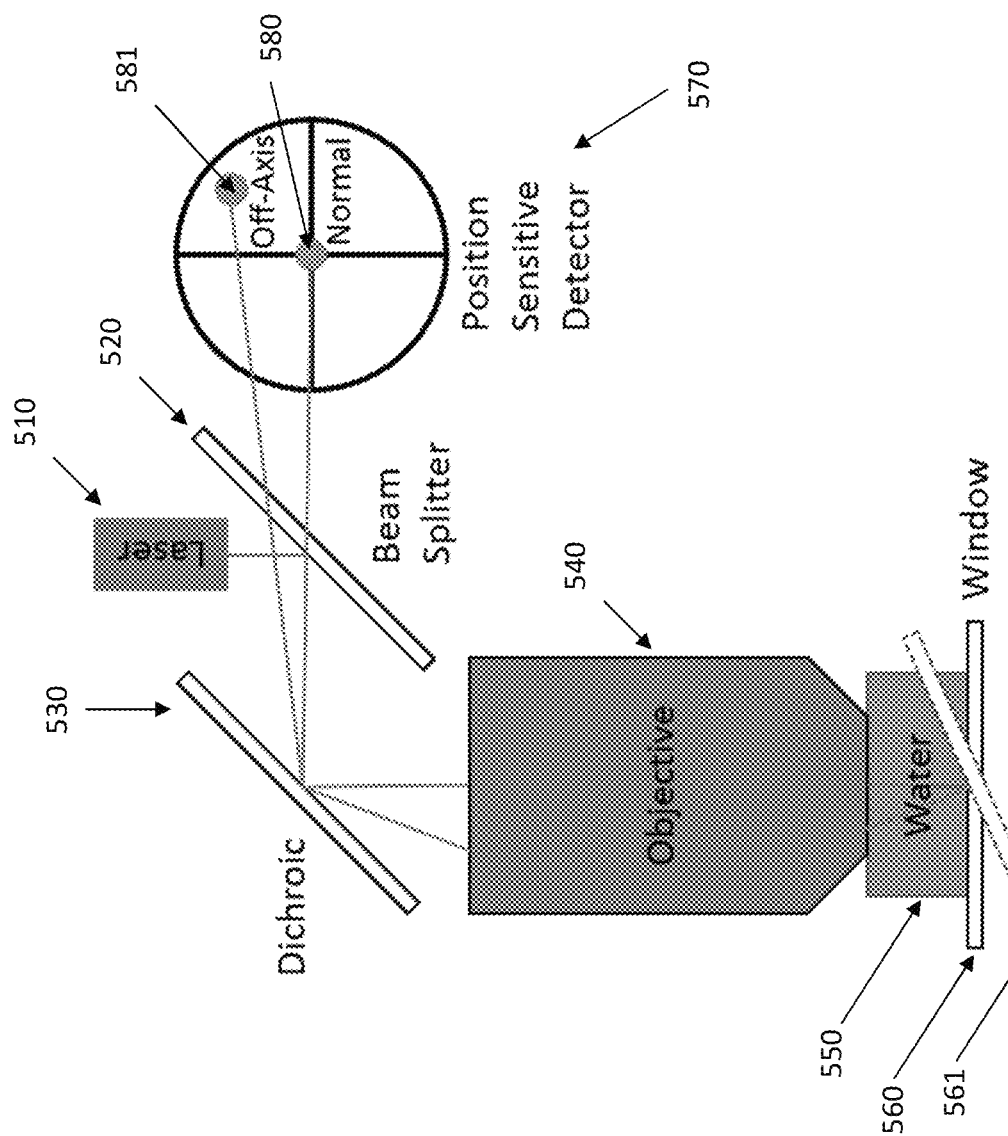
FIG. 5 shows the use of a position sensitive detector to detect angular information of the window according to an embodiment.

To keep track of the incident angle with respect to the window, a feedback mechanism can be implemented to provide a readout of the angular information. The incident angle will be monitored with an auxiliary laser in conjunction with a Position Sensitive Sensor (PSD), which will provide the required feedback for maintaining normal incident condition. An embodiment is shown in FIG. 5, where a laser 510 emits a light beam towards a beam splitter or dichroic mirror 520, the beam is reflected to another beam splitter or dichroic mirror 530, the beam splitter or dichroic mirror 530 reflects the beam into an objective 540 which is immersed in water 550. The beam is reflected at the interface of water and the window. In the case where the window 560 is normal to the optical axis, the beam is reflected back to the beam splitter or dichroic mirror 530 and through the beam splitter or dichroic mirror 520 into the center 580 of a position sensitive detector 570. In the case where the window 561 is not normal to the optical axis, the beam is reflected back off-axis to the beam splitter or dichroic mirror 530 and through the beam splitter or dichroic mirror 520 into an off-center location 581 of the position sensitive detector 570.

The laser line can be chosen to be away from the excitation and emission wavelengths that are being used for imaging the fluorescent sample. A dichroic mirror or beam splitter can be used to couple the laser into the optical path. The laser can be collimated or focused by proper lenses. A quadrant position sensitive detector can be used to detect the reflected light from the sample window. If the window surface is normal to the objective, the output of the PSD will be null. Otherwise, an offset signal indicating an angle away from normal can be obtained and the corresponding motion will be applied to the stage to correct the error.

Figure 6:
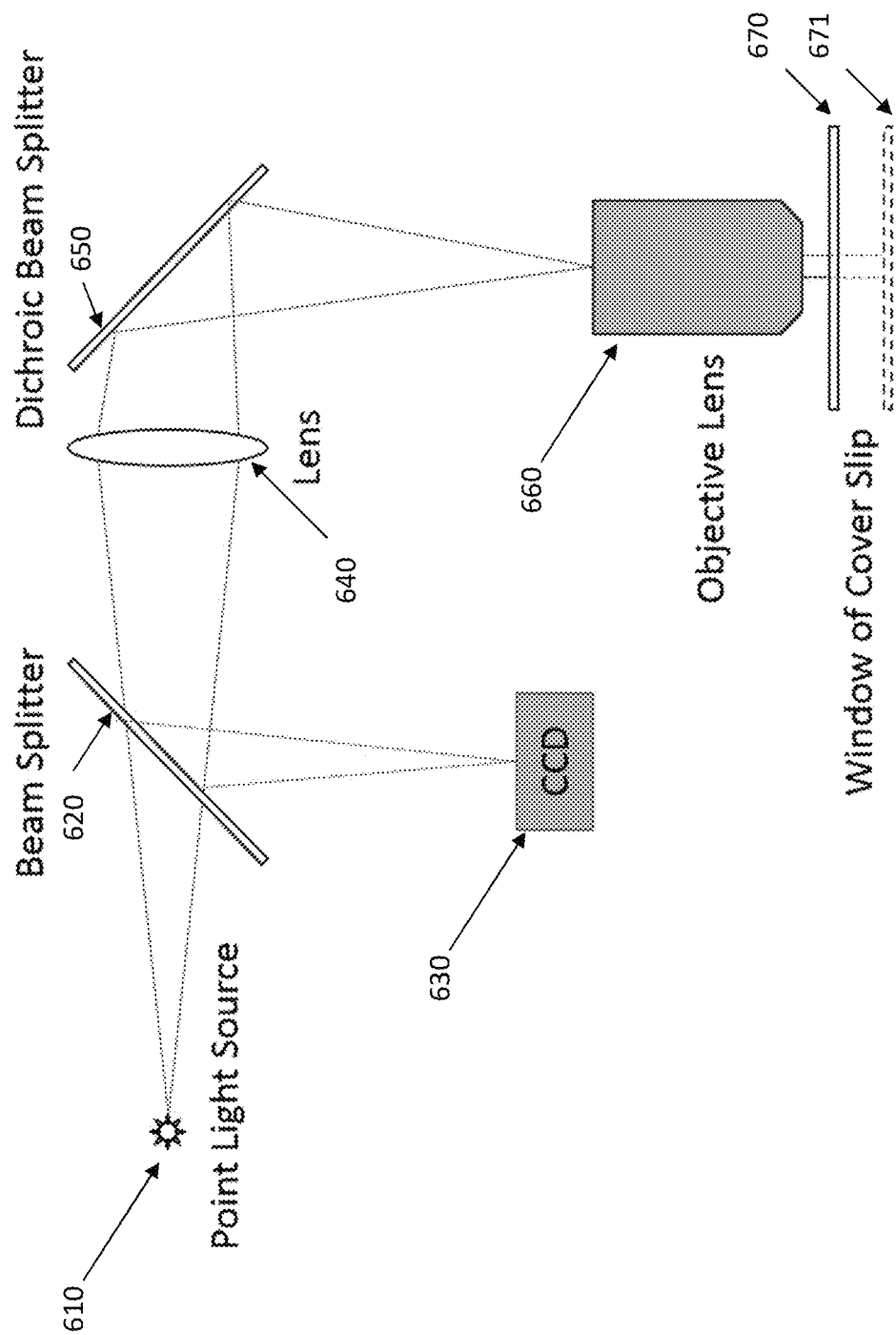
FIG. 6 shows a point light source placed at the conjugated Fourier plane of the objective lens according to an embodiment.

In one embodiment, the optics is configured such that, on the camera or PSD, the size of the spot of the reflected light is a constant despite of the distance between the objective and the window surface. This is convenient since the objective lens needs to move up or down to focus at different depth below the window. To fulfil such requirement, the point light source is placed at the conjugated Fourier plane of the objective lens. As illustrated in FIG. 6, a point light source 610 emits a light that passes through a beam splitter 620. The light is focused by a lens 640 and redirected by a dichroic beam splitter 650 to the objective lens 660. The window of a cover slip may be at different distances 670, 671 from the objective lens. The light reflected by the window travels back through the objective lens, and is reflected by the dichroic beam splitter 650 back to the beam splitter 620 and reflected to a CCD 630. The point source can be 1) a pinhole illuminated with an incoherent light source; 2) a single mode or multimode fiber coupled LED or diode laser; 3) a small LED. Note that the arrangement of the components in FIG. 6 is different from that of FIG. 5 to illustrate that the light source, and detector can be placed at some more convenient locations, depending on the desired configurations and setup.

Figure 7:
FIG. 7 shows the reflections from other surfaces showing up in the CCD as multiple spots according to an embodiment.

However, there is a drawback in the optics configuration described in the above embodiment of FIG. 6. For some objective lenses, the CCD detects also reflections from other surfaces including bottom of objective lens and objective lens elements. As shown in FIG. 7, those reflections show up in the CCD as multiple spots, which hinder the process of tracking the correct spot.

Figure 8:
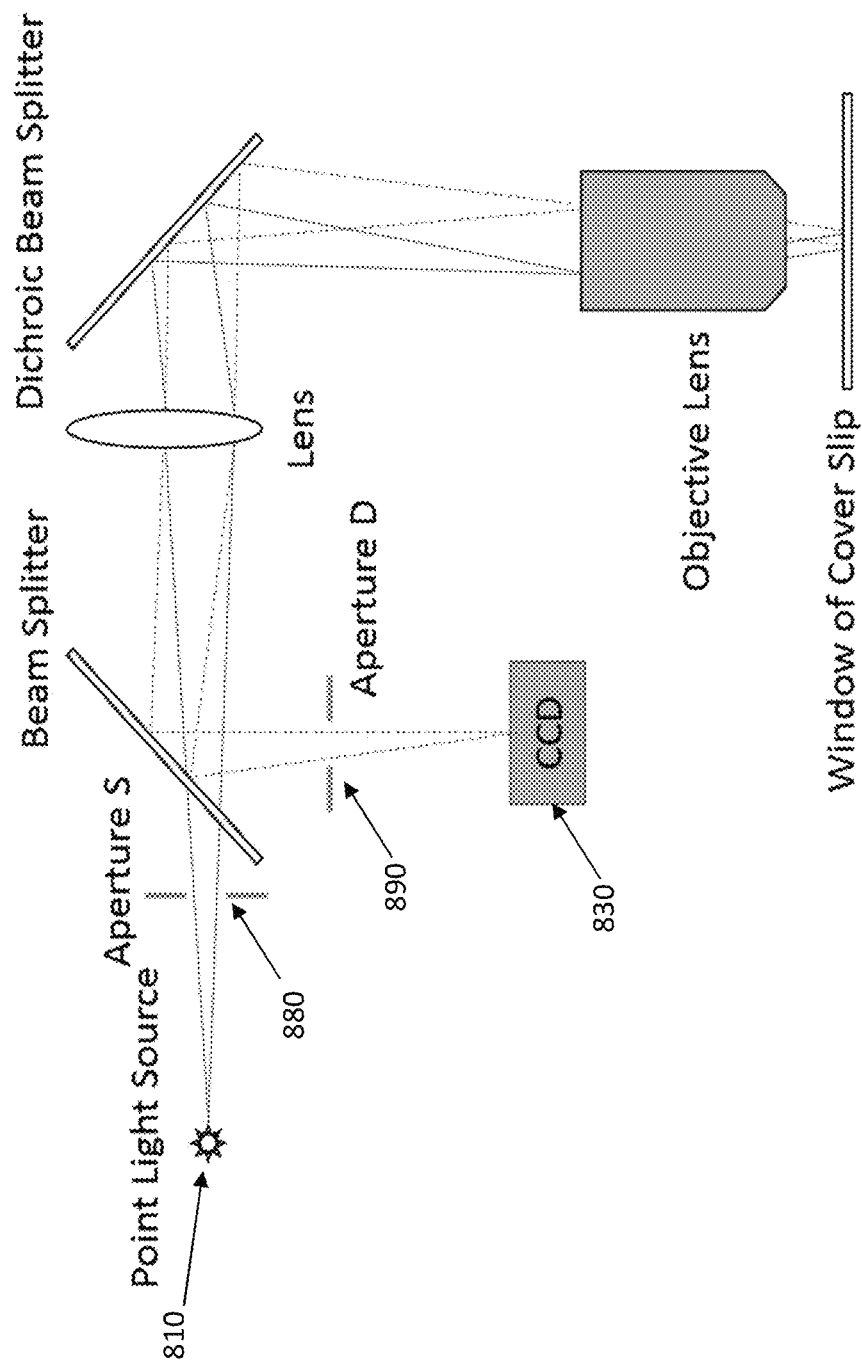
FIG. 8 shows an aperture added in front of the light source to limit the cone angle of light according to an embodiment.
Figure 9:
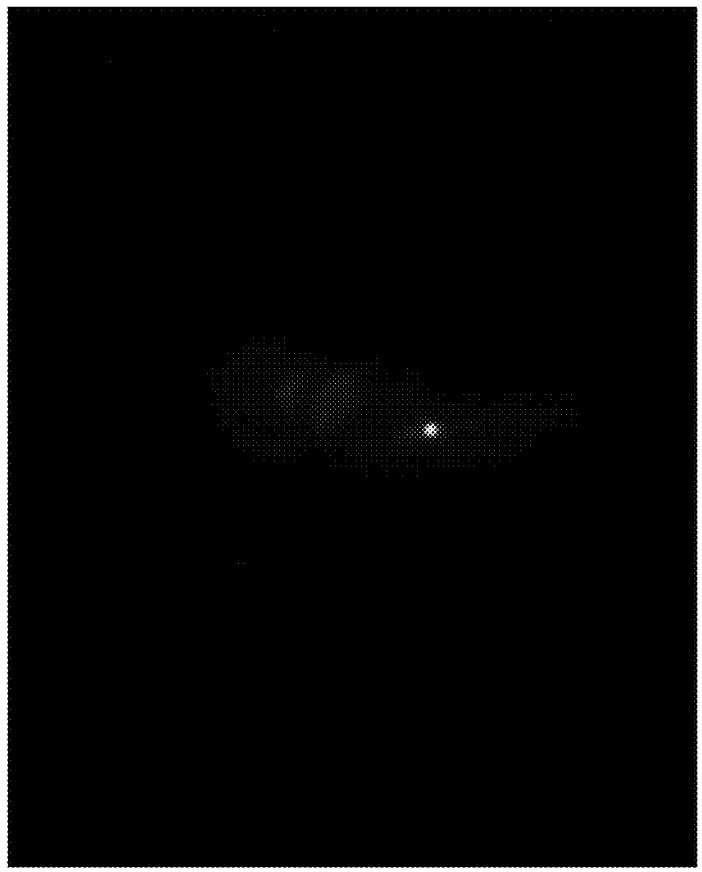
FIG. 9 shows the result of suppressing or eliminating reflection from surfaces outside of the depth of interest.

FIG. 8 shows an embodiment that provides a method to suppress unfavorable reflections. An aperture "S" 880 is added in front of the light source 810 to limit the cone angle of light. The point light source 810 in conjunction with aperture "S" 880 is off-centered from the optics axis such that the collimated light comes out below the objective at an angle. Another aperture "D" 890 is added in front of the CCD 830 or PSD sensor such that only reflections from certain depth below the objective lens pass through. Both CCD 830 and aperture "D" 890 are shifted off-center. The locations and diameters of aperture "S" and "D" are adjusted according to the targeted detection depth range. The reflection from surfaces outside of the depth of interests is suppressed or eliminated. The result is shown in FIG. 9.

A parallel kinematic positioning stage according to an embodiment may be used to adjust the position of the objective or the position of the window, or both the positions of the objective and the window.

Figure 11:
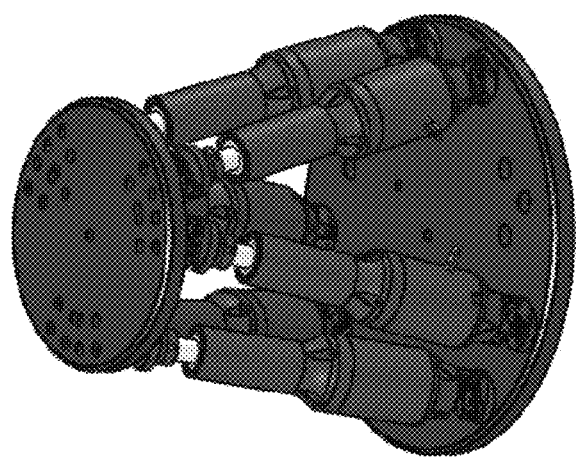
FIG. 11 is a perspective view of a hexapod according to an embodiment.
Figure 10:
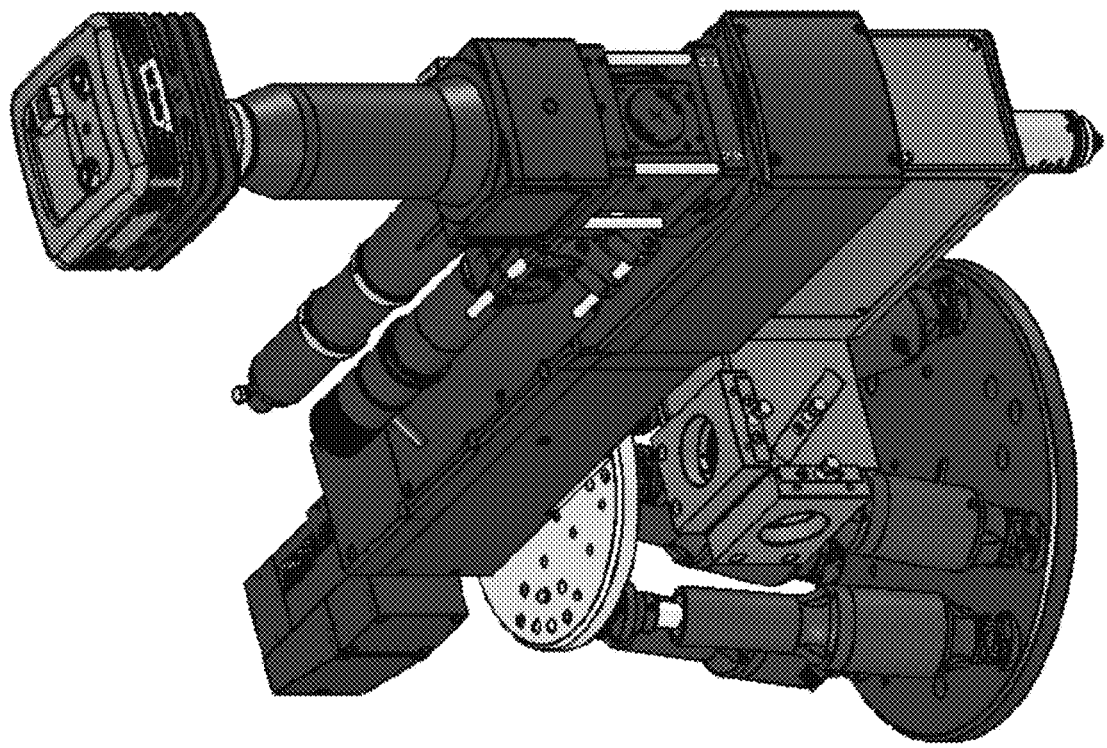
FIG. 10 is a perspective view of an incident angle tracking microscope mounted on a hexapod according to an embodiment.
Figure 13A:
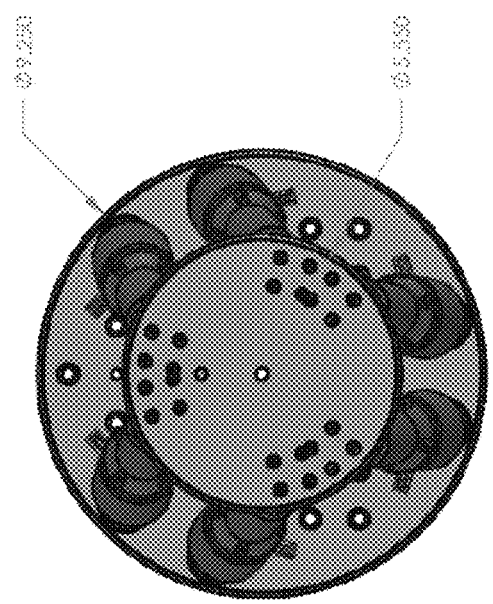
FIG. 13A, FIG. 13B and FIG. 13C are respectively the top view, front view and side view of a hexapod according to an embodiment.
Figure 13C:
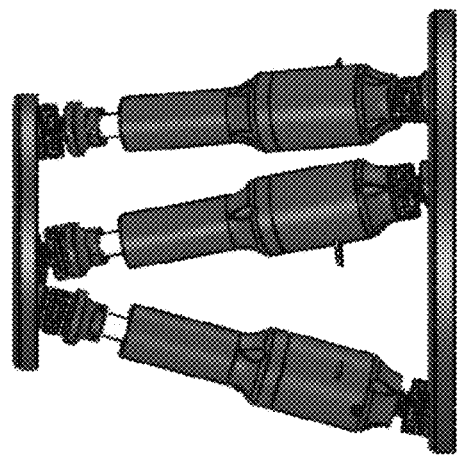
Figure 13B:
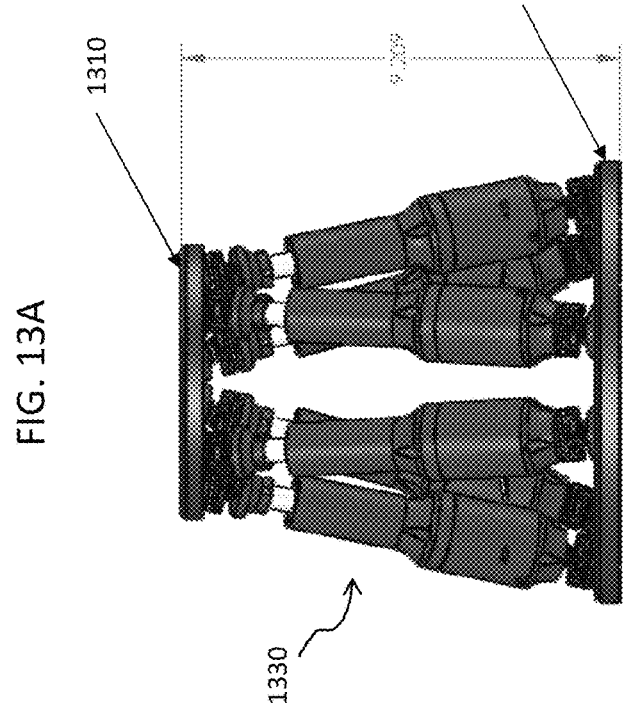

FIG. 10 illustrates a non-limiting example that a microscope is mounted on an adjustable stage, so that the entire microscope can be moved. Although the microscope is shown as being mounted in the upright position, it is also possible to mount the microscope in an inverted position or sideway or angled position. FIG. 11 is a perspective view of the adjustable stage according to an embodiment. FIGS. 13A-13C are top view, front view and side view of the stage. In a preferred embodiment, the stage includes 6 strut assemblies 1330 arranged as a hexapod configuration on the baseplate 1320. This allows for a virtual pivot point at which the platform 1320 may be rotated about.

Figures 12A, 12B, 12C:
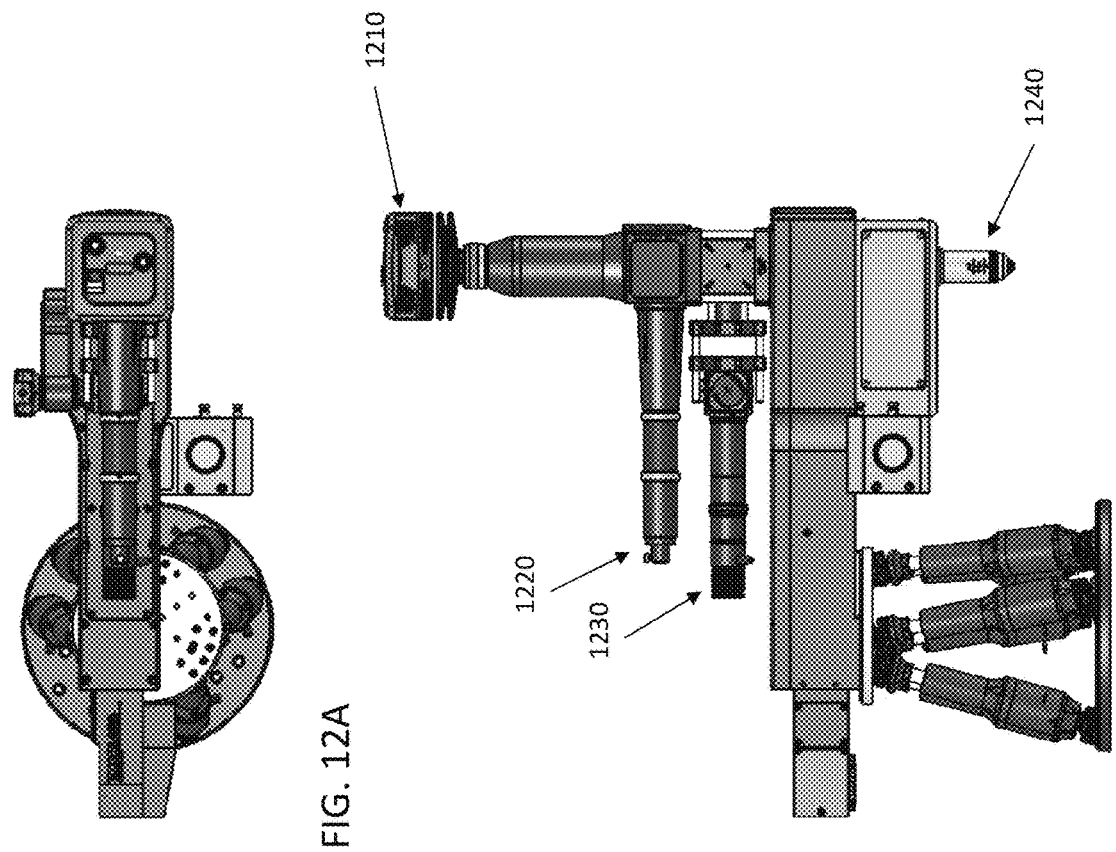
FIG. 12A, FIG. 12B and FIG. 12C are respectively the top view, front view and side view of an incident angle tracking microscope mounted on a hexapod according to an embodiment.

As shown in FIGS. 12A-12C, an imaging camera 1210 is place at the eye piece of the microscope. The microscope has an imaging illumination port 1220 for illuminating a sample. A perpendicularity sensor light source 1230 is provided for tracking the incident angle with respect to the sample window below the objective lens 1240. The perpendicularity sensor 1250 may be a position sensitive sensor or a quadrant position sensitive detector.

In a hexapod, typically, the mounting points on the plates include ball joints or universal joints for allowing free rotation at the mounting points. In high precision applications, high rigidity and near-zero play at the joints are essential for accurate positioning of the platform. However, ball joints and universal joints do have some play between the moving parts, such as the ball and socket, and the contact surfaces tend to wear out over time due to friction. An embodiment provides a hexapod with flexures to provide rigidity and zero play such that a truly parallel kinematic positioning stage may be realized.

Figure 14A:
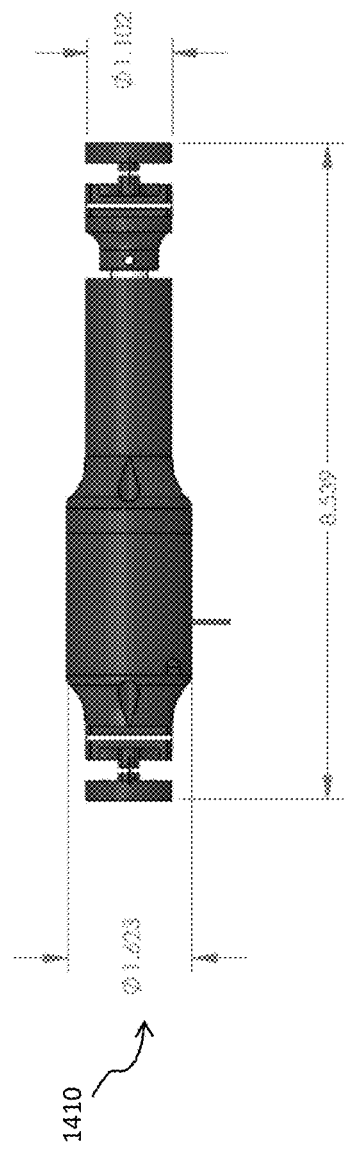
FIG. 14A shows a strut assembly.

FIG. 14A shows a strut assembly 1410 according to an embodiment. In contrast to rotating joints, such as ball joints and universal joints, the joint according to an embodiment is stiff in the z-direction and rotationally flexible in the x and y directions. Here the z-direction corresponds to the direction along which the strut may extend or retract, and x-y plane is perpendicular to the z-axis. Note that this coordinate system of each strut is different from the (X, Y, Z) coordinate system of the platform itself (i.e., lateral, longitudinal and vertical directions of the platform).

Figure 14B:
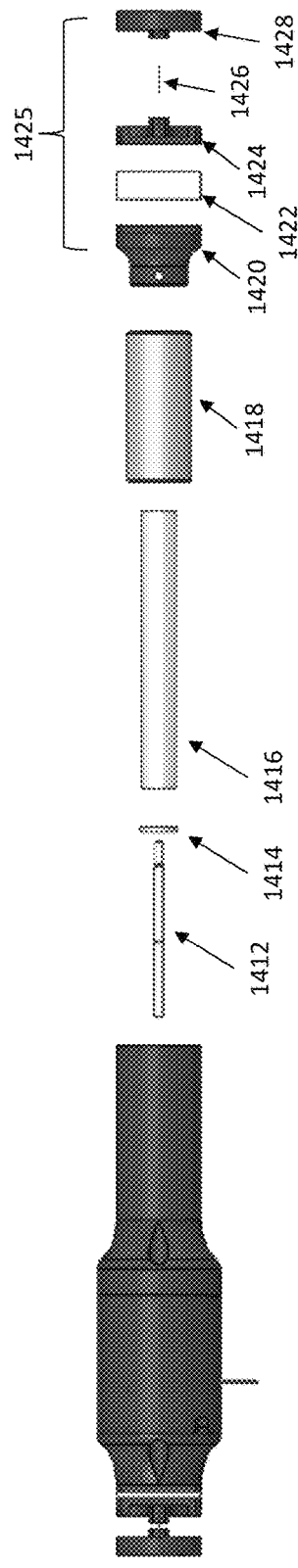
FIG. 14B and FIG. 14C show the strut assembly partially disassembled.
Figure 14C:
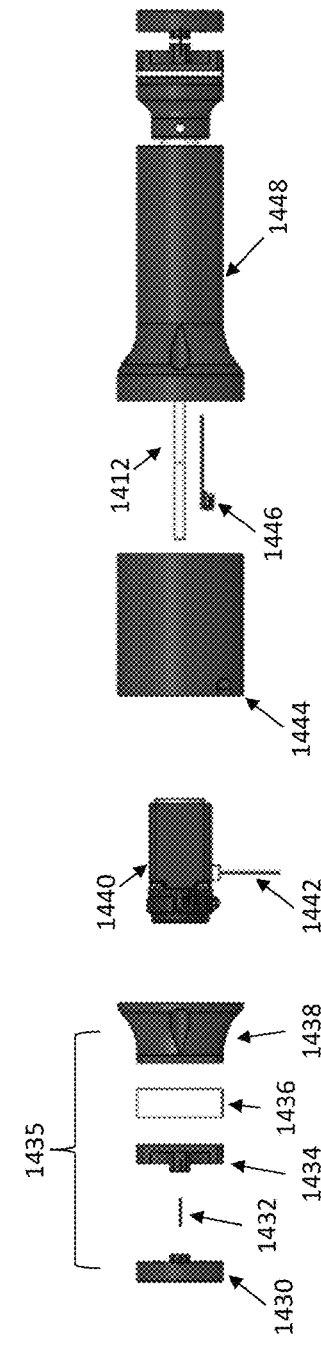

As can be seen from FIGS. 14B and 14C, the linear actuator includes a stepper motor 1440 having a nut inside the motor that rotates around a threaded rod 1412. (Note that other types of linear actuators are also contemplated, e.g., voice coil and magnet.) A magnet 1414 is placed between the threaded rod and the linear bearing shaft. The threaded rod pushes or pulls the linear bearing shaft 1416 when current is applied to the motor cables 1442. A limit PCB 1446 is used to limit the range of motion. The linear bearing bushing 1418 supports the linear bearing shaft in the housing 1448. At one end of the strut assembly is a first flexure assembly. A spring steel flexure 1422 is place perpendicular to another spring steel flexure 1426. The flexure joint bracket 1424 includes perpendicular slots on opposite sides to accommodate one side of the spring steel flexure 1422 and one side of the spring steel flexure 1426. A flexure joint bracket 1420 fixes another side of the spring steel flexure 1422, thus allowing the spring steel flexure 1422 to only flex in a first direction. Another flexure joint bracket 1428 fixes another side of the spring steel flexure 1426, thus allowing the spring steel flexure 1426 to only flex in a second direction. The first direction and the second direction are perpendicular. Thus the first flexure assembly is rigid in the z-direction, and may be bent in the x-y directions as defined by the orientations of the spring steel.

At the other end of the strut assembly is a second flexure assembly. The second flexure assembly similarly includes a spring steel flexure 1436 placed perpendicular to another spring steel flexure 1432. The flexure joint bracket 1434 includes perpendicular slots on opposite sides to accommodate one side of the spring steel flexure 1422 and one side of the spring steel flexure 1426. A flexure joint bracket 1438 fixes another side of the spring steel flexure 1436, thus allowing the spring steel flexure 1436 to only flex in a first direction. Another flexure joint bracket 1430 fixes another side of the spring steel flexure 1432, thus allowing the spring steel flexure 1432 to only flex in a second direction. The first direction and the second direction are perpendicular. Thus the first flexure assembly is rigid in the z-direction, and may be bent in the x-y directions.

Figure 15:
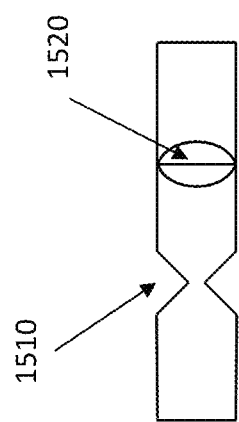
FIG. 15 shows a monolithic flexure assembly according to an embodiment.
Figure 15:
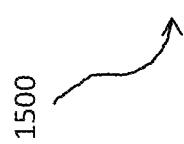

In one embodiment, the flexure assembly includes a monolithic body. As shown in FIG. 15, the monolithic body 1500 is a rod made of a resilient material, such as steel, etc. The body 1500 has two grooves 1510 and 1520 at two locations where the body can bend. The two grooves run in perpendicular direction with respect to each other and they are also perpendicular to the length of the body, so that the monolithic flexure body is rigid in the z-direction, and may be bent in the x-y directions.

A processor may utilize the signal from the position sensitive detector to control the strut assemblies to manipulate the stage. A feedback loop may provide continuous angle information to the processor to maintain the proper alignment during the imaging process.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An imaging incident angle tracking device, comprising:
   a light source;
   a first beam splitter or dichroic mirror;
   a second beam splitter or dichroic mirror; and
   a position sensitive detector;
   wherein the first and second beam splitters or dichroic mirrors are configured to direct light from the light source to a window surface through an objective lens; the first and second beam splitters or dichroic mirrors are further configured to direct the light reflected from the window surface and through the objective lens into the position sensitive detector such that an angle of the window surface relative to the objective lens is determined from the detected position of the incident light on the position sensitive detector.

2. The imaging incident angle tracking device of claim 1, wherein the position sensitive detector is a quadrant position sensitive detector.

3. The imaging incident angle tracking device of claim 1, further comprising a processor configured to use a signal detected by the position sensitive detector to control a stage on which the objective or window surface is mounted.

4. The imaging incident angle tracking device of claim 1, further comprising a lens arranged between the first and second beam splitters or dichroic mirrors to focus the light onto the objective lens, wherein the light source is a point light source and placed at a conjugated Fourier plane of the objective lens.

5. The imaging incident angle tracking device of claim 4, further comprising a first aperture placed in front of the light source and a second aperture placed in front of the position sensitive detector, such that the point light source in conjunction with the first aperture is off-centered from the optics axis such that the light comes out below the objective lens at an angle, and that only reflections from a desired depth below the objective lens pass through the second aperture into the position sensitive detector.

6. An imaging system comprising an imaging microscope equipped with an imaging incident angle tracking device that comprises:
   a light source;
   a first beam splitter or dichroic mirror;
   a second beam splitter or dichroic mirror; and
   a position sensitive detector;
   wherein the first and second beam splitters or dichroic mirrors are configured to direct light from the light source to a window surface through an objective lens; the first and second beam splitters or dichroic mirrors are further configured to direct the light reflected from the window surface and through the objective lens into the position sensitive detector such that an angle of the window surface relative to the objective lens is determined from the detected position of the incident light on the position sensitive detector, and
   the imaging microscope is mounted on a positioning system that has six degrees of freedom.

7. The imaging system of claim 6, wherein the positioning system is a hexapod.

8. A positioning system, comprising:
   a baseplate;
   a platform; and
   a plurality of strut assemblies;
   wherein a first end of each of the plurality of strut assemblies is connected at a predefined location on the top surface of the baseplate and a second end of each of the plurality of strut assemblies is connected at a corresponding predefined location on the bottom surface of the platform;
   wherein each of the strut assembly comprises:
   a linear actuator configured to change the distance between the two ends along the length of the strut assembly;
   a first flexure assembly at the first end of the strut assembly; and
   a second flexure assembly at the second end of the strut assembly;
   wherein the first and second flexure assemblies are rigid along the length of the strut assembly and flexibly bendable orthogonal to the length of the strut assembly.

9. The positioning system of claim 8, comprising six strut assemblies arranged as a hexapod configuration to provide six degrees of freedom movement of the platform.

10. The positioning system of claim 8, wherein each of the flexure assembly comprises a first flexure connected to a second flexure, the first flexure being flexible in a first flex direction orthogonal to the length of the strut assembly and the second flexure being flexible in a second flex direction orthogonal to the length of the strut assembly, and the first flex direction being perpendicular to the second flex direction.

11. The positioning system of claim 8 wherein each of the linear actuator is a threaded rod and stepper motor type actuator.

12. The positioning system of claim 8, further comprising a processor configured to control each of the linear actuator.

13. The positioning system of claim 8, wherein each of the first and second flexure assemblies comprises a monolithic body having a first location on the body that is flexible in a first flex direction orthogonal to the length of the strut assembly and a second location on the body that is flexible in a second flex direction orthogonal to the length of the strut assembly, and the first flex direction being perpendicular to the second flex direction.

* * * * *